United States Patent Office 3,441,623
Patented Apr. 29, 1969

3,441,623
PROCESS FOR THE PREPARATION OF β-CAROTENE AND INTERMEDIATES THEREOF FROM WASTE MOTHER LIQUORS
Joseph Donald Surmatis, West Caldwell, N.J., assignor to Hoffmann-La Roche Inc., Nutley, N.J., a corporation of New Jersey
No Drawing. Continuation-in-part of application Ser. No. 543,018, Apr. 18, 1966. This application Mar. 24, 1967, Ser. No. 625,591
Int. Cl. C07c 1/00, 1/20
U.S. Cl. 260—666                              18 Claims

ABSTRACT OF THE DISCLOSURE

A process whereby the waste mother liquors containing uncrystallizable $C_{20}$ vitamin A active material such as vitamin A alcohol and alkyl esters thereof or uncrystallizable $C_{20}$ intermediates convertible to a vitamin A active material are utilized to produce β-carotene, including process for producing intermediates of β-carotene from these waste mother liquors.

CROSS-REFERENCES TO RELATED APPLICATIONS

This application is a continuation-in-part of Ser. No. 543,018, Surmatis, filed Apr. 18, 1966, now Patent No. 3,367,985, issued Feb. 6, 1968, which is a continuation-in-part of Ser. No. 451,638, Surmatis, filed Apr. 28, 1965, now abandoned. This application is also a continuation-in-part of application Ser. No. 427,137, Surmatis, filed Jan. 21, 1965, now abandoned. This application is a continuation-in-part of application Ser. No. 427,122, Surmatis, filed Jan. 21, 1965. This application is a continuation-in-part of application Ser. No. 410,284, Surmatis, filed Nov. 10, 1964.

BACKGROUND OF THE INVENTION

The present invention relates to a process for the preparation of β-carotene from waste mother liquors from the synthesis of vitamin A active material, which mother liquors contain uncrystallizable $C_{20}$ vitamin A alcohol, uncrystallizable $C_{20}$ intermediates convertible to vitamin A active alcohols or uncrystallizable vitamin A active esters having from 21 to 36 carbon atoms. Furthermore, this invention includes a process for preparing phosphonium salts and aldehydes from these waste mother liquors.

In the synthetic preparation of vitamin A or vitamin A esters, the vitamin A active material which can be either the vitamin A alcohol or its lower alkyl esters, or the $C_{20}$ intermediates in the preparation of vitamin A active material can only be partially prepared in the form of crystalline or all-trans material from the mixtures which result from their preparation or isomerization procedures. Even when the remaining mother liquors are subjected to completed work-up operations according to known procedures, it is not possible to isolate all the vitamin A active material present in the pure crystalline form to a satisfactory extent. These difficulties are largely due to the vitamin A active material or the $C_{20}$ vitamin A intermediates being present in numerous isomeric forms, for example, 13-cis-, 11-cis-, 11,13-di-cis, 9-cis, or 9,13-di-cis-. The fact that these various isomers are isomerizable with difficulty is particularly aggravating. Hence, there remains after the separation of crystalline all-trans vitamin A or crystalline $C_{20}$ intermediates in the preparation of vitamin A, a mixture containing various isomers of vitamin A active material or $C_{20}$ intermediates of vitamin A which are usually discarded as waste. This is true despite various attempts which have been made to utilize these mixtures.

SUMMARY OF THE INVENTION

In accordance with this invention, it has been discovered that cis-β-carotene can be prepared by reacting (A) a phosphonium salt prepared from mother liquors which can be any one of the following: (1) a mother liquor containing uncrystallizable $C_{20}$ material remaining after the synthesis of crystallizable vitamin A alcohol; (2) a mother liquor containing uncrystallizable material having from 20 to 36 carbon atoms remaining after the synthesis of crystallizable alkyl esters of vitamin A alcohol; or (3) a mother liquor containing uncrystallizable $C_{20}$ material remaining after the synthesis of crystallizable $C_{20}$ intermediates convertible to vitamin A alcohol; with (B) vitamin A active aldehydes prepared from any of the above mother liquors in the presence of an inert solvent. The cis-β-carotene thrus-formed can be converted into the all-trans-β-carotene by isomerization.

The phosphonium salt is prepared in accordance with this invention by reacting any one of the following: (1) a mother liquor containing uncrystallizable $C_{20}$ material remaining after the synthesis of crystallizable vitamin A alcohol; (2) a mother liquor containing uncrystallizable material having from 20 to 36 carbon atoms remaining after synthesis of the crystallizable alkyl esters of vitamin A alcohol; or (3) a mother liquor containing uncrystallizable $C_{20}$ material remaining after the synthesis of crystallizable $C_{20}$ intermediates convertible to vitamin A alcohol, wherein the mother liquor has been worked up in the same manner as the crystallizable $C_{20}$ intermediate is worked up to form a vitamin A material selected from the group consisting of vitamin A alcohol or alkyl esters of vitamin A alcohol; with a compound of the formula:

wherein $R_1$, $R_2$ and $R_3$ are selected from the group consisting of alkyl radicals containing from 1 to 14 carbon atoms; aryl radicals containing from 6 to 18 carbon atoms; and aralkyl radicals containing from 7 to 23 carbon atoms, in the presence of a proton donor or with an acid addition salt of the compound of Formula I above.

In accordance with this invention, the vitamin A active aldehyde can be formed by oxidizing any one of the following: (1) a mother liquor containing uncrystallizable $C_{20}$ material remaining after the synthesis of crystallizable vitamin A alcohol; (2) a mother liquor containing uncrystallizable material having from 20 to 36 carbon atoms remaining after the synthesis of crystallizable alkyl esters of vitamin A alcohol, wherein the mother liquor has been treated with a saponifying agent; or (3) a mother liquor containing uncrystallizable $C_{20}$ material remaining after the synthesis of crystallizable $C_{20}$ intermediates convertible to vitamin A alcohol, wherein the mother liquors have been worked up in the same manner as the crystallizable $C_{20}$ intermediates are worked up to form vitamin A alcohol.

Hence, by means of this invention, a process is provided by which the conversion of mother liquors containing uncrystallizable vitamin A active material or $C_{20}$ intermediates in the production of vitamin A can be converted into useful carotenoids. Indeed, useful carotenoids can be obtained from mother liquors containing uncrystallizable vitamin A, vitamin A esters or containing uncrystallizable $C_{20}$ intermediates in the production of vitamin A without purifying the mother liquors further in the conversion process. This latter feature of not purifying the mother liquors during the process of their conversion to β-carotene presents an important advance in the art since savings in time, equipment and expenses are realized thereby.

The reaction between the aforementioned phosphonium salt and the vitamin A active aldehyde wherein the phosphonium salt and the aldehyde are prepared from the above mother liquors, has been found to produce an isomer of B-carotene, i.e., 13-mono-cis-B-carotene. In accordance with this invention, it has been discovered that this 13-mono-cis-β-carotene can be easily converted into all-trans-β-carotene by simply heating in the presence of an inert organic solvent.

DETAILED DESCRIPTION

As used herein, the term "alkyl" includes both straight and branched chain carbon-hydrogen containing radicals having from 1 to 16 carbon atoms, such as methyl, ethyl, propyl, isopropyl, butyl, isobutyl, decyl, hexadecyl, and the like. The term "halogen" includes all four halogens, i.e., iodine, bromine, chlorine and fluorine.

The term "vitamin A active material" as used herein means compounds containing from 20 to 36 carbon atoms having the same hydrocarbon configuration as crystalline vitamin A alcohol or alkyl esters thereof, said compounds existing in any of the stereo-isomeric forms of vitamin A alcohol or its alkyl esters. The term "vitamin A active alcohol" as used herein means compounds containing 20 carbon atoms having the same hydrocarbon configuration of crystalline vitamin A alcohol, said compounds existing in any of the stereo-isomeric forms of vitamin A alcohol. The term "vitamin A active alcohol esters" as used herein means compounds containing 21 to 36 carbon atoms having the same hydrocarbon configuration of crystalline vitamin A alcohol esters, said compounds existing in any of the stereo-isomeric forms of vitamin A alcohol esters. The term "vitamin A active aldehyde" as used herein means compounds containing 20 carbon atoms having the same hydrocarbon configuration of crystalline vitamin A aldehyde, said compounds existing in any of the stereo-isomeric forms of vitamin A aldehyde.

In accordance with this invention, the waste mother liquor which can be converted to β-carotene can be obtained from all mother liquors resulting from known syntheses of crystalline vitamin A alcohol or lower alkyl esters thereof. In accordance with this invention, it has been found that when the crystalline vitamin A alcohol is separated after synthesis, the remaining mother liquor from the vitamin A alcohol synthesis contains uncrystallizable $C_{20}$ vitamin A active material that can be converted to the phosphonium salt. Furthermore, it has been found that when the crystalline vitamin A ester having from 21 to 36 carbon atoms is separated after synthesis, the mother liquor which contains uncrystallized vitamin A active material having from 20 to 36 carbon atoms can be converted into a phosphonium salt. The vitamin A active material in mother liquor remaining after syntheses of the crystallizable vitamin A esters contains the vitamin A active material both in unesterified form and in the form of the alkyl ester thereof.

Examples of known syntheses of crystalline vitamin A alcohol or alkyl esters thereof from which the mother liquors thereof after crystallization of the vitamin A alcohol or esters can be utilized to prepare the phosponium salt in accordance with this invention are:

The mother liquor resulting from condensing β-ionylideneethyl-triphenyl-phosphonium halides and β-formylcrotonic acid esters or α-acyloxytiglinic aldehydes followed by reduction, Agnew Chem. 1960, 72, p. 811.

The mother liquor resulting from the condensation of β-ionylidene acetaldehyde and senecioic acid esters followed by reduction, Journal of Vitaminology, 1958, 4, p. 178.

The mother liquor resulting from reacting the condensation product of β-ionylidene ethanol and acetone with α-haloacetic acid or lower alkyl esters thereof followed by dehydration and reduction, U.S. Patent No. 2,576,103.

The mother liquor resulting from β-ionylidene acetaldehyde condensed with β-methylglutaconic anhydride followed by saponification and acidulation to form a diacid and thereafter decarboxylating the diacid to a monoacid and finally reducing the mono-acid, U.S. Patent No. 2,709,712.

The mother liquor resulting from the Grignard reaction of 2 - methyl-4-(2',6',6'-trimethylcyclohexen-1'-yl)-buta-2-ene-1-al with the condensation product of a dilower alkyl acetal of acetoacetaldehyde with acetylene to form an acetylenic 3,6-diol acetal, followed by hydrogenating said acetylenic 3,6-diol acetal to the corresponding olefinic 3,6-diol acetal, dehydrating and hydrolyzing said olefinic 3,6-diol acetal to the corresponding aldehyde and finally reducing said aldehyde, U.S. Patent No. 2,676,992.

The mother liquor resulting from condensing β-ionylidene acetaldehyde with acetone followed by condensing with cyanoacetic acid or esters thereof followed by reduction, D.A.S. No. 1,041,950.

The mother liquor resulting from the Grignard condensation of 4-(2',6',6'-trimethyl-cyclohexen - 1' - yl)-(1)-2-methyl-butene-(2)-al-(1) with 1-hydroxy-3-methylpentene-(2)-yne-(4) or esters thereof followed by partial hydrogenation, esterification if the 1-hydroxy compound is utilized, allyl rearrangement and dehydration, and if desired, saponification, U.S. Patent No. 2,451,739.

The mother liquor resulting from the Grignard condensation of 4-(2',6',6'-trimethyl - cyclohexene-1'-yl)-butene-(3)-one-(2) with 3-hydroxy-(3)-methylhexene-(1)-yne-(5) followed by partial hydrogenation, allyl rearrangement and dehydration, U.S. Patent No. 2,475,139.

The mother liquor resulting from the condensation product of β-ionone with 1-hydroxy-3-methylhexene-(2)-yne-(5) or esters thereof followed by hydrogenation, allyl rearrangement and dehydration, U.S. Patent No. 2,529,498.

The phosphonium salt intermediate in the preparation of β-carotene is obtained from the mother liquors containing the uncrystallizable vitamin A active material by reacting these mother liquors with a phosphine of the formula:

wherein $R_1$, $R_2$ and $R_3$ are selected from the group consisting of alkyl radicals containing from 1 to 14 carbon atoms; aralkyl radicals containing from 7 to 23 carbon atoms; and aryl radicals containing from 6 to 18 carbon atoms.

In this reaction, the mother liquor containing the uncrystallizable vitamin A active material in the form of an alkyl ester can be directly reacted with a compound of Formula I to form the phosphonium salt in accordance with this invention. Hence, there is no need for saponifying the mother liquors containing the uncrystallizable vitamin A ester isomers to form a mother liquor containing uncrystallizable vitamin A alcohol. Therefore, the phosphonium salt can be prepared directly from a mother liquor remaining after the synthesis of crystallizable vitamin A esters, which mother liquor contains uncrystallizable vitamin A active alcohol esters.

This reaction is generally carried out in the presence of an inert solvent utilizing a proton donor. Typical insert solvents which can be utilized include ethanol, benzene, tetrahydrofuran, ethyl ether, etc. Any conventional proton donor can be utilized in carrying out this reaction. Typical proton donors which can be employed in the above process include inorganic acids, such as the hydrohalic acids (especially hydrochloric or hydrobromic acid) or sulfuric acid. All acids which form acid addition salts with phosphines of Formula I above (e.g., strong organic acids such as benzenesulfonic acid or trichloroacetic acid) can also be employed. Typical phosphines of Formula I above which can be reacted with the vitamin A alcohol or vitamin A ester mother liquor to produce the phosphonium salt in accordance with this invention include triphenyl-phosphine, tritolyl-phosphine, diphenyl-tolyl-phosphine, tri(p - methoxyphenyl)-phosphine, diphenylmonomethyl-phosphine, diphenyl-mono-decyl-phosphine. The preferred phosphine of Formula I above is triphenylphosphine. In carrying out this reaction, temperature and pressure are not critical and this reaction can be carried out at room temperature as well as elevated or reduced temperatures.

On the other hand, the phosphonium salt can be prepared in accordance with this invention from the mother liquors of vitamin A alcohol or vitamin A esters by reacting the mother liquors of vitamin A or vitamin A esters with an acid addition salt of the phosphine compound of Formula I. These acid addition salts of the compound of Formula I include any of the salts of the aforementioned acids. This reaction is preferably carried out in the presence of any of the aforementioned inert solvents. When the acid addition salt of the phosphine of Formula I is employed, it is preferred that the acid used to form the acid addition salt be a pharmaceutically acceptable strong acid such as the mineral acids and strong organic acids such as the sulfonic acids, e.g., benzene- and toluenesulfonic acid, etc. Non-pharmaceutical acceptable strong acids can also be employed, since the salt is not present in the final carotenoid product. In carrying out this reaction with the acid addition salt of the phosphine of Formula I above, temperature and pressure are not critical. Therefore, room temperature or elevated or reduced temperatures can be utilized.

In preparing the vitamin A active aldehyde intermediate from the aforementioned vitamin A alcohol mother liquors containing the uncrystallizable vitamin A active material in the form of the alcohol, the mother liquor is treated with an oxidizing agent such as potassium permanganate, manganese dioxide, potassium dichromate, etc., to convert the un-crystallizable vitamin A active alcohol into vitamin A active aldehyde. Any conventional oxidizing agent can be utilized to convert the vitamin A active material into the vitamin A active aldehyde. Generally, it is preferred to conduct the oxidation reaction at a temperature of from about $+10°$ C. to about $+50°$ C., preferably at room temperature or about 25 to 30° C., under an atmosphere of nitrogen. Any inert solvent, particularly a hydrocarbon, e.g., petroleum ether or hexane, preferably hexene, or a chlorinated hydrocarbon, e.g., methylene chloride, can be employed. In preparing the vitamin A active aldehyde from the aforementioned mother liquors containing the uncrystallizable vitamin A active alkyl esters, the uncrystallizable vitamin A active esters are first saponified by treating the mother liquors with a strong inorganic base to convert the uncrystallizable vitamin A active ester to the active alcohol. Any conventional means of saponifying an ester can be utilized to convert the un-crystallizable vitamin A active esters in the mother liquor to the uncrystallizable vitamin A active alcohol. Thereafter, the so-formed vitamin A active alcohol can be oxidized, in the manner hereinbefore described, to form the vitamin A active aldehyde.

Furthermore, in accordance with this invention, the phosphonium salt or the aldehyde can be prepared from mother liquors containing the uncrystallizable $C_{20}$ material remaining after the synthesis of crystallizable $C_{20}$ intermediates convertible to vitamin A alcohol or vitamin A esters. This is accomplished by separating the crystallizable $C_{20}$ intermediates from the mother liquor and then working up this mother liquor in the same manner as the crystallizable intermediate is worked up to form vitamin A alcohol or alkyl esters thereof. After the mother liquor is worked up in this manner, it is reacted with the compound of Formula I above or with an acid addition salt of the compound of Formula I above to produce the phosphonium salt. This reaction is carried out in the same manner as described with relation to the formation of the phosphonium salt from mother liquors remaining after the production of crystallizable vitamin A alcohol or vitamin A esters.

On the other hand, the mother liquors separated from the crystallizable $C_{20}$ intermediates of vitamin A, which mother liquor has been worked up, in the same manner as are the crystallizable $C_{20}$ intermediates to form vitamin A alcohol, can be oxidized by any of the aforementioned means to form the vitamin A active aldehyde. On the other hand, if desired, the worked-up mother liquors produced in the synthesis of the $C_{20}$ intermediates in the production of vitamin A alcohol can be divided into two portions. One portion can be treated with an oxidizing agent, e.g., potassium permanganate, manganese dioxide, potassium dichromate, etc., to form the vitamin A active aldehyde; and the other portion can be treated with the compound of Formula I or the acid addition salt of the compound of Formula I above to form the crude phosphonium salt.

In forming the phosphonium salt or the vitamin A active aldehyde in accordance with this invention, mother liquors remaining from the crystallization of any conventional crystallizable $C_{20}$ vitamin A intermediate which can be converted to vitamin A alcohol or vitamin A esters by any one of or combination of all of the following steps can be utilized:

hydrogenation,
reduction,
oxidation,
allyl rearrangement,
decarboxylation,
hydrolysis,
dehydration,
saponification,
esterification, etc.

Hence, the mother liquor containing the uncrystallizable $C_{20}$ material resulting from the crystallization of a $C_{20}$ intermediate convertible to vitamin A alcohol or alkyl esters thereof can be utilized to prepare the phosphonium salt in accordance with this invention. This can be done by subjecting this mother liquor after the removal of the crystalline $C_{20}$ intermediate therefrom, to the same set of reactions which the crystalline intermediate itself would undergo to form vitamin A alcohol or esters thereof. Furthermore, the mother liquor containing the uncrystallizable $C_{20}$ material resulting from the crystallization of a $C_{20}$ intermediate convertible to vitamin A alcohol can be utilized to prepare vitamin A active aldehyde in accordance with this invention. This can be done by means of oxidizing this mother liquor after the crystalline $C_{20}$ intermediate has been removed and after this mother liquor has been subjected to the same set of reactions that the crystalline intermediate would undergo to form vitamin A alcohol.

Among the mother liquors which can be utilized is the mother liquor resulting from the synthesis of the crystallizable intermediate oxenin [1,6-dihydroxy-3,7-dimethyl - 9 - (2',6',6'-trimehtyl-cyclohexen-1'-yl)-2,7-nonadien-4-yn] by reacting 4-(2',6',6'-trimethyl-cyclohexen-1'-yl)-2-methyl-2-butene-1-al with 3-methyl-2-pentene-4-yn-1-ol. Furthermore, the mother liquor remaining after the production of crystalline hydroxenin [1,6-dihydroxy-3,7-dimethyl - 9 - (2',6',6' - trimethyl-cyclohexen-1'-yl)-nonatriene-2,4,7] can be utilized as well, this mother liquor being obtained from the hydrogenation of oxenin. Therefore, the mother liquors remaining after removal of either oxenin or hydroxenin from the reaction mixture which has heretobefore been discarded as waste can be utilized in the preparation of β-carotene in accordance with this invention.

The oxenin mother liquor is converted into the vitamin A active material by means of partial hydrogenation, esterification, dehydration and allyl rearrangement followed, if desired, by saponification. The partial hydrogenation takes place before the steps of allyl rearrangement and dehydration. In purifying the mother liquor of oxenin before converting the mother liquor to produce the vitamin A active material, it is preferred to distill the mother liquors after the crystallization of oxenin therefrom and collect the fraction boiling in the range of about 80° C. to about 98° C. at about 6 to 12 microns pressure. This fraction is mainly a mixture of isomers of oxenin having 20 carbon atoms. The purified oxenin mother liquor can then be partially hydrogenated at the triple bond. For this purpose, means customarily adopted for selectively reducing a triple bond can be employed. The addition of hydrogen can be carried out by catalytic hydrogenation in the presence of palladium catalysts such as, for instance, palladium-on-calcium carbonate and palladium-on-barium sulfate; for selective hydrogenation of the triple bond, palladium-on-charcoal onto which quinoline has been absorbed before use is preferred. The introduction of hydrogen is stopped as soon as the calculated quantity of hydrogen has been taken up. Another method of hydrogenating the triple bond in the mother liquor containing the uncrystallizable isomers of oxenin is by hydrogenating the mixture in the presence of a lead-poisoned palladium catalyst (see, e.g., H. Lindar, Helv. Chim. Act, 35, 446 (1952)) until approximately one molar equivalent of hydrogen is consumed.

The oxenin mother liquor containing the uncrystallizable $C_{20}$ intermediate is esterified by any conventional means prior to the steps of dehydration and allyl rearrangement. Any conventional esterifying agent can be utilized in this procedure to esterify the mother liquors. Typical esterifying agents which can be utilized include lower alkanoyl halides, lower alkanoyl anhydrides, and the like. In carrying out the esterification reaction, temperature and pressure are not critical and the esterification reaction can be carried out at room temperature and/or elevated temperatures.

The esterified product can then be subjected to dehydration and allyl rearrangement. Any conventional method of allyl rearrangement and dehydration can be utilized. One method of dehydration and allyl rearrangement is carried out by subjecting the uncrystallizable $C_{20}$ material in the hydrogenated oxenin mother liquor to the process disclosed in Huckel, "Theoretische Grundlagen, der Organischen Chemie (third edition, vol. 1, page 277, Leitzig (1940)). In this method, the hydroxyl group in position 6 is split out by dehydration forming a double bond in position 6 followed by shifting the double bond from position 7 to position 8. Another method of producing the dehydration and allyl rearrangement is to react the mother liquor with one equivalent of a phosphorous halide or a phosphorous oxyhalide at low temperature in the presence of an inert solvent to produce dehydration followed by heating to produce allyl rearrangement. For this reason, phosphorous tribromide and phosphorous oxychloride have proven to be well suited. In this manner, the hydroxyl group is replaced with a halo or oxyphosphorous group. Removal of this substituent group by heating results in allyl rearrangement. The dehydration and allyl rearrangement may also be effected without substitution, for instance, by heating in an inert solvent, such as xylol, preferably in the presence of a dehydrating agent such as iodine, paratoluenesulfonic acid, etc.

Another means for effecting allyl rearrangement and dehydration is by treatment with a mineral acid, e.g., hydrochloric acid, hydrobromic acid, hydriodic acid, etc. Any conventional means for allyl rearrangement and dehydration such as disclosed in U.S. Patents Nos. 2,475,139, 2,490,358, 2,610,207, and 2,610,208, can be utilized in accordance with this invention.

The esterification of the mother liquor remaining after the synthesis of crystalline oxenin should be carried out before subjecting the uncrystallizable $C_{20}$ intermediates to dehydration and allyl rearrangement. The esterification protects the terminal hydroxy group of the uncrystallizable $C_{20}$ intermediate during the steps of dehydration and allyl rearrangement. Upon allyl rearrangement and dehydration, the mother liquor contains vitamin A active material mostly in the form of the ester due to this esterification step. This worked up mother liquor can be treated with any conventional saponifying agent, if desired, to form vitamin A alcohol. This is especially desirable if the worked-up mother liquor is to be used in the preparation of the aldehyde. However, the worked-up mother liquor containing the uncrystallizable vitamin A esters can be directly reacted with the compound of Formula I above, as hereinbefore mentioned to form the phosphonium salt.

Hydroxenin mother liquors can be converted into the vitamin A active alcohol or vitamin A active ester by means of esterification, allyl rearrangement and dehydration, and if the vitamin A alcohol active ester is desired, saponification. The allyl rearrangement and dehydration, esterification and saponification can be carried out by any of the foregoing means.

The mother liquor containing the $C_{20}$ material remaining after the crystallization of the condensation product of β-ionone with 1-hydroxy-3-methyl-hexene-2-(yn)-(5) or lower alkyl esters thereof can be converted into the vitamin A active alcohol or vitamin A active ester by means of partial hydrogenation, allyl rearrangement and dehydration. The hydrogenation, allyl rearrangement and dehydration steps can be carried out in the same manner as that discussed in connection with oxenin.

The mother liquor containing $C_{20}$ material remaining after the crystallization of the product resulting from the condensation of 4-(2',6',6'-trimethyl-cyclohexen-1'-yl) buten-(3)-one-(2) with 3-hydroxy-(3)-methyl-hexen-(1)-yne-(5) can be converted into vitamin A active material by means of partial hydrogenation, dehydration and allyl rearrangement. The steps of hydrogenation, dehydration and allyl rearrangement can be carried out in the same manner as described for oxenin.

The mother liquor containing $C_{20}$ material remaining after the reaction product from the Grignard synthesis of 2-methyl-4-(2',6',6'-trimethyl-cyclohexen-1'-yl) - buta-2-ene-l-al with the condensation product of a dilower alkyl acetal of acetoacetaldehyde with acetylene can be converted into the vitamin A active material by means of partial hydrogenation, dehydration and allyl rearrrangement, followed by hydrolysis and reduction. In this process 2-methyl-4-(2',6',6'-trimethyl-cyclohexen-l-yl) - buta - 2 - ene-l-al is reacted by means of a Grignard synthesis with the condensation product of a dilower alkyl acetal of acetoacetaldehyde with acetylene to form an acetal of a $C_{20}$ acetylenic-3(6-diol. After crystallization of this $C_{20}$ acetylenic 3,6-diol, the mother liquors containing uncrystallizable $C_{20}$ material are hydrogenated by any of the aforementioned means to reduce the acetylenic linkage in the $C_{20}$ material to an olefinic linkage. The crude olefinic $C_{20}$ 3,6-diol acetal in the treated mother liquor is thereafter converted to vitamin A active aldehyde by subjecting the mother liquor to dehydration, allyl rearrangement and hydrolysis. The dehydration and allyl rearrangement is preferably carried out by treatment of the crude olefinic 3,6-diol in the mother liquor with a phosphorous halide or oxyhalide, preferably in combination with pyridine or a similar tertiary amine. This reaction proceeds at room temperature or at elevated temperatures. After dehydration and allyl rearrangement of the crude compound in the mother liquor, the crude compound is hydrolyzed by treating the mother liquor with an aqueous acid to form vitamin A active aldehyde. The vitamin A active aldehyde is converted to vitamin A active alcohol by means of treating the mother liquor with a reducing agent such as an ether soluble metal hydride such as lithium aluminum hydride, lithium borohydride, or the like. Any conventional means of reduction or reducing agent can be employed in accordance with this invention.

In accordance with this invention, the mother liquor containing $C_{20}$ uncrystallizable material which results from the crystallization of the reaction product of cyanoacetic acid or esters thereof with the condensation product of β-ionylidene acetaldehyde and acetone can be converted into the vitamin A active material by means of reduction. This is accomplished by reducing $C_{20}$ material in the mother liquor to convert this material to vitamin A active alcohol or alkyl esters thereof. The reduction can be carried out by any conventional means, such as by treating the mother liquor with a basic reducing agent. As the basic reducing agent, both the ether soluble basic metal hydrides and the aluminum alkoxides are well suited.

The mother liquor containing the uncrystallizable $C_{20}$ material resulting from crystallization of the condensation product of β-ionylidene acetaldehyde and β-methylblutaconic anhydride can be converted into the vitamin A active alcohol by means of saponifying the mother liquors, acidulating the saponified mother liquors to produce vitamin A diacid therein and decarboxylating the vitamin A diacid therein to form a vitamin A mono-acid and reducing the crude vitamin A mono-acid to vitamin A active alcohol.

Any conventional means of saponifying the uncrystallizable $C_{20}$ material in the crude mother liquor remaining after the synthesis and crystallization of the condensation product of β-ionylidene acetaldehyde with β-glutaconic anhydride can be utilized, such as treating the condensation product with a strong alkali. In this manner, the $C_{20}$ material is converted into a dibasic acid salt. Acidulation of the dibasic acid salt to the dibasic acid is similarly effected according to well known procedures as by treatment with an aqueous mineral acid, or the like. The crude diacid thus obtained has the basic polyene structure of a vitamin A active material with the exception of the carboxy substituent on the gamma carbon atom. The diacid is thereupon converted to a vitamin A acid active material by means of decarboxylating the diacid. Decarboxylation can be effected merely by heating the diacid. Preferably, decarboxylation is effected by heating the diacid in the presence of an organic base and more desirably also in the presence of a metal catalyst, such as copper bearing material. The vitamin A acid in the mother liquor is thereafter reduced to the vitamin A active alcohol by using any of the aforementioned methods of reduction.

The mother liquor containing $C_{20}$ material resulting from the separation of the crystallizable reaction product of an α-haloacetic acid or alkyl ester thereof with the condensation product of β-ionylidene ethanol and acetone can be converted into the vitamin A active alcohol or vitamin A active ester by means of allyl rearrangement and dehydration, followed by reduction. Any conventional means of dehydration, allyl rearrangement and reduction such as those hereinbefore mentioned can be utilized in converting the $C_{20}$ material in the mother liquor of this reaction product into vitamin A active alcohol, or vitamin A active ester.

The mother liquor containing $C_{20}$ material resulting from the crystallization of the condensation product of β-ionylidene-acetaldehyde with senecioic acid can be converted into the vitamin A active alcohol or vitamin A active ester by means of reducing this condensation product. Any of the aforementioned means of reduction can be utilized in carrying out this reaction.

The mother liquor remaining after the production of a crystalline $C_{20}$ material product by the condensation of β-ionylidene ethyl triphenyl-phosphonium halide and β-formylcrotonic acid or α-acyloxy-tiglinic aldehyde can be converted into the vitamin A active alcohol or vitamin A active esters by means of reducing these mother liquors. Any of the conventional methods of reduction hereinbefore mentioned can be utilized in converting these mother liquors into vitamin A active material.

The formation of β-carotene is carried out in accordance with this invention by reacting the phosphonium salt prepared from the aforementioned mother liquors with the vitamin A active aldehyde prepared from the crude aforementioned mother liquors. In accordance with this invention, either the phosphonium salt or the aldehyde can be prepared from pure crystalline vitamin A material.

The condensation of the phosphonium salt with vitamin A active aldehyde is conducted in accordance with this invention, in the presence of a proton acceptor. The proton acceptors employed are preferably basic agents, e.g., strong bases such as alkali metal hydroxides, alkaline earth metal hydroxides, alkali metal amides, alkaline earth metal amides, alkali metal alcoholates, alkaline earth metal alcoholates, ammonia, strongly basic amines, metallo-organic compounds, particularly Group I metallo-alkyl and Group I metallo aryl compounds, such as lithium metal, lithium phenyl, sodium phenyl, sodium methyl, Grignard compounds, e.g., alkyl and aryl magnesium halides, etc. Sodium methoxide and potassium hydroxide are preferred although sodium amide has been found quite effective. The temperature of this reaction is not critical and room temperature can be utilized. Generally, it is preferred to carry out this condensation reaction at a temperature of from 10° C. to 40° C. Furthermore, it is generally preferred to carry out this condensation reaction in the presence of an inert organic solvent. The preferred solvents employed in this reaction are methanol, tetrahydrofuran, pyridine, isopropyl ether and ethyl ether, although any inert solvent may be employed.

In accordance with this invention, the resulting 13-mono-cis-β-carotene formed by the condensation of the phosphonium salt with the vitamin A active aldehyde can then be isomerized to trans-β-carotene. The preferred method of isomerization is to heat the mixture at a temperature of from 50° to 100° C. in the presence of an inert organic solvent for a period of from about 1 hour to 10 hours or longer. Generally, it is preferred to carry out this reaction at a temperature of from 90° to 95° C. While temperatures of greater than 120° C. can be utilized, it is seldom advisable to utilize such high temperatures due to the danger of most solvents boiling at such high temperatures. It is preferred to carry out this reaction in the presence of a hydrocarbon solvent such as heptane, benzene, etc. However, any of the solvents that are utilized for the condensation reaction can be utilized to carry out this reaction.

The instant invention will be better understood by reference to the following examples which are given for illustration purposes only and are not meant to limit the invention. In the examples, the temperature is in degree centigrade.

Example 1

3.75 kilos of the crude mother liquor of vitamin A acetate obtained from the conversion of 1-acetoxy-3,7-dimethyl - 6 - hydroxy-9-(2',6',6'-trimethyl-cycohexen-(1')-yl)-nonatriene-2,4,7 which remained after the separation of crystalline vitamin A acetate in accordance with the procedure of Example 7 of U.S. Patent No. 2,610,207 (with an assay of $0.851 \times 10_6$ units of vitamin A per gram) was dissolved in 28 liters of methyl alcohol, 200 ml. of a benzene solution containing 9.0 grams of butylated hydroxyanisole and 9 g. of butylated hydroxytoluene, and 1200 ml. of aqueous sodium hydroxide (50 per cent by weight) were added. The above mixture was stirred under an atmosphere of nitrogen for one hour at 20–25° C. The resulting solution was transferred to a separator and diluted with an equal volume of water. Solid carbon dioxide was added while stirring until the excess sodium hydroxide had all reacted as indicated by pH paper. The resulting vitamin A alcohol was extracted three times, each time with 6,000 ml. of petroleum ether, from the above solution. The extracts were combined and washed with 6,000 ml. of water. The petroleum ether solvent was then distilled off under vacuum at 40–45° C. 3370 g. of crude vitamin A alcohol, assaying 29 per cent, was obtained.

The above crude vitamin A alcohol was disolved in 12 liters of hexane. To this was added 9.5 kg. of $MnO_2$ and the reaction mixture stirred under an atmosphere of nitrogen in the absence of light for 20 hours at 20–25° C. The spent $MnO_2$ was filtered in an inert atmosphere and thoroughly washed with hexane. On evaporation of the solvent at 40° C. under vacuum, 3,360 grams of crude vitamin A aldehyde was obtained. This was equivalent to 767 g. (2.69 moles) of pure vitamin A aldehyde.

Retinyl triphenyl-phosphonium chloride was next prepared as follows:

3.0 kg. of mother liquor vitamin A acetate obtained by concentrating the mother liquors which resulted after the crystallization of all-trans vitamin A acetate according to the procedure of Example 7 of U.S. Patent No. 2,610,207 with an assay of $0.851 \times 10_6$ u./g., (USP XVI MS) equivalent to 889 g. (2.69 moles) of pure vitamin A acetate, was disolved in 21.6 liters of methyl alcohol. 150 ml. of a benzene solution containing 7.5 g. of butylated hydroxyanisole and 7.5 g. of butylated hydroxytoluene was added together with 960 ml. of aqueous sodium hydroxide (50 percent). The resulting solution was stirred under an atmosphere of nitrogen for one hour at 20–25° C. To the resulting mixture was added an equal volume of water. Solid carbon dioxide was added while stirring until the pH of 7.5 was reached. The crude vitamin A alcohol was extracted three times, each time with 6 liters of hexane. The hexane solvent was removed under vacuum at 45–50 °C. and the residue, weighing 2.74 kg., was disolved in 9 liters of methyl alcohol. 1.18 kg. of triphenyl-phosphine was added thereto and 1.18 liters of methanolic HCl (0.172 g. HCl/ml.) was dropped in over a period of two hours. The reaction was stirred under nitrogen for 24 hours to form the crude retinyl triphenyl-phosphoium chloride.

The reaction vessel containing the solution of crude retinyl triphenyl-phosphonium chloride was fitted with two dropping funnels. A freshly prepared solution of sodium methoxide in methyl alcohol which was prepared by dissolving 138 g. of metallic sodium in 3 liters of methyl alcohol was added from one funnel. The 2.69 moles of crude vitamin A aldehyde previously prepared was dissolved in 3 liters of methyl alcohol and added simultaneously from the other funnel. The additions were completed in two hours at 15–20° C. The stirring was continued under nitrogen overnight. On the following morning the crystalline 13-mono-cis-β-carotene was filtered and washed on the filter with 20 liters of water. The crystalline crude β-carotene was then suspended in 20 liters of denatured alcohol and stirred under an atmosphere of nitrogen and heated until refluxing started. The product was filtered hot. The product was then isomerized by heating in heptane at 90 to 95° C. for 20 hours to give all trans β-carotene.

Example 2

The process of Example 1 was carried out except that the mother liquor resulted from crude vitamin A acetate prepared according to the example described in U.S. Patent No. 2,610,208. Pure trans-β-carotene was obtained by this process.

Example 3

940 grams of a crude vitamin A alcohol mother liquor obtained after the crystallization of vitamin A alcohol produced in accordance with U.S. Patent No. 2,451,739 by the condensation of 4-(2′,6′,6′,-trimethyl-cyclohexane-1′yl)-(1)-2-methyl butene-(2)-al-(1) with 1-hydroxy-3-methyl pentene-(2)-yne-(4) was dissolved in 7200 ml. of hexane. To this was added 3360 grams of MnO₂ and the reaction mixture stirred under at atmosphere of nitrogen in the absence of light for 20 hours at 20–25° C. The spent MnO₂ was filtered in an inert atmosphere and thoroughly washed with hexane. On evaporation of the solvent at 40° C. under vacuum, 910 of crude vitamin A aldehyde red syrup was obtained. This was equivalent to 291 g. (1.0 mole) of vitamin A aldehyde by assay.

Retinyl triphenyl-phosphonium chloride was next prepared as follows:

1.0 kg. of the crude orange-yellow oil mother liquor prepared in accordance with Example 1 of U.S. Patent No. 2,451,739 which remained after the crystallization of vitamin A prepared by the condensation of 4-(2′,6′,6′-trimethyl - cyclohexen - 1′ - yl) - (1) - 2 - methyl - butene-(2)-al-1 with 1-hydroxy-3-methyl pentene-(2)-yne, was dissolved in 3 l. of methyl alcohol. 400 grams of triphenylphosphine was added thereto and 400 ml. of methanolic HCl (0.172 g. HCl/ml.) was dropped in over a period of two hours. The reaction was stirred under nitrogen for 24 hours to form the crude retinyl triphenyl-phosphonium chloride.

The reaction vessel containing the solution of crude retinyl triphenyl-phosphonium chloride was fitted with two dropping funnels. A freshly prepared solution of sodium methoxide in methyl alcohol which was prepared by dissolving 46 g. of metallic sodium in 1 liter of methyl alcohol was added from one funnel. 291 grams of the crude vitamin A aldehyde syrup previously prepared was dissolved in 1 liter of methyl alcohol and added simultaneously from the other funnel. The additions were completed in two hours at 15–20° C. The stirring was continued under nitrogen overnight. On the following morning the crystalline 13-mono-cis-β-carotene was filtered and washed on the filter with 7 liters of water. The crystalline 13-mono-cis-β-carotene was then suspended in 7 liters of denatured alcohol and stirred under at atmosphere of nitrogen until refluxing started. The product was filtered hot and washed with a little denatured alcohol. After drying under vacuum, trans β-carotene was produced.

Example 4

The procedure of Example 3 was carried out except that the crude product was the mother liquor obtained in Example 1 of U.S. Patent No. 2,529,498, by means of the production of crystallizable vitamin A by the condensation of 1-hydroxy-3-methylhexene-(2)-yne-(5) with β-ionone. The product obtained, after isomerization, was all-trans β-carotene.

Example 5

The procedure of Example 3 was carried out except that the crude product was the crude mother liquor which resulted from the production of vitamin A alcohol by the procedure of Examples 1 through 7 in U.S. Patent 2,676,-992 through condensation of 2-methyl - 4 - (2′-6′,6′-trimethyl-cyclohexene-1′-yl)-buta-2-ene-1-al) with the condensation product of diacetal aceto-acetaldehyde and acetylene.

Example 6

β-Carotene was produced by the procedure of Example 3 except that the mother liquor utilized was obtained after crystallization of vitamin A in Example 1 of U.S. Patent No. 2,576,103 through reaction of the condensation product of β-ionylidene ethanol and acetone with ethyl bromoacetate.

Example 7

β-Carotene was produced by the procedure of Example 3 except that the mother liquor utilized was obtained as in Example 11 of U.S. Patent No. 2,709,712 by the production of vitamin A through the condensation of β-ionylidene acetaldehyde and β-ionylidene acetaldehyde and β-methyl gluctaconic anhydride.

Example 8

β-Carotene was produced in accordance with the procedure of Example 3 except that the mother liquor obtained after crystallization of vitamin A as described in Agew. Chem. 1960, 72, page 811 through the condensation of β - ionylidene - ethyltriphenylphosphonium chloride and α-acyloxy-tiglinic aldehyde was utilized to prepare the phosphonium salt and the aldehyde.

Example 9

The procedure of Example 3 was carried out except that crude vitamin A obtained from the condensation of β-ionylidene acetaldehyde and the methyl ester of senecioic acid was utilized to prepare the phosphonium salt and the aldehyde.

Example 10

Oxenin mother liquors which resulted from purification of oxenin by crystallization, which normally are discarded as waste, were concentrated under vacuum (20 mm. pressure) at 40° C. to a syrup. One part of the recovered syrup was dissolved in 5 parts by volume of pyridine and 5 parts by volume of petroleum ether, and a solution of 0.29 part by weight of acetyl chloride in 5 parts by volume of petroleum ether are added thereto in the course of 24 hours at 20° C. The reaction solution is poured on a mixture of ice and water. The petroleum ether solution is washed successively with normal sulfuric acid aqueous sodium bicarbonate solution and water, dried with potassium carbonate and concentrated to form a yellow oil.

One part by weight of this oil was dissolved in 5 parts by volume of methyl alcohol, whereupon one mole of hydrogen was added thereto at room temperature in the presence of 0.1 part by weight of 4 percent palladium charcoal onto which quinoline had been absorbed. Hydrogenation was then discontinued, the catalyst is filtered off, filtrate is diluted with water and the reaction mixture is extracted with petroleum ether and concentrated to from a yellow oil.

One part by weight of this oil and three parts by volume of toluene was added at a bath temperature of 95° C. to a solution of 0.33 part by volume of phospohorous-oxychloride in two parts by voulme of pyridine and four parts by volume of toluene. This mixture was stirred for 30 minutes, then diluted with petroleum ether, poured on ice and then the petroleum ether solution was washed successively with an aqueous solution containing 5 percent by weight of sulfuric acid, a sodium bicarbonate solution and ethanol and dried with sodium sulfate, whereupon the solvent was evaporated. The crude product thus obtained was a red-brown oil which in turn consisted of a mixture of cis- and trans isomers of vitamin A in the form of the acetate.

Triphenyl-phosphine (260 g.), and concentrated sulfuric acid (48 ml.) were dissolved in 3000 ml. of methyl alcohol in the order named, and the resulting solution was stirred for one hour.

1 kg. of the crude vitamin A isomer mixture prepared above was dissolved in 2000 ml. of methyl alcohol and added to the reaction vessel containing the above triphenyl-phosphine mixture. This was then stirred under an atmosphere of nitrogen for 20 hours.

This solution was used for the next step without further purification.

In a 12 liter flask, there was placed 1.0 kg. of crude vitamin A acetate prepared above from oxenin. To this was added 7 liters of methyl alcohol, 50 ml. of a benzene solution containing 2.5 g. each of BHA and BHT, and 400 ml. of 50 percent aqueous sodium hydroxide solution. This was stirred under an atmosphere of nitrogen for one hour at 25°. The solution was transferred to a separator and diluted with an equal volume of water. Dry Ice was added while stirring, until the excess sodium hydroxide was reacted, as indicated by a pH measurement. This was then extracted 3 times with 2,000 ml. of petroleum ether. The combined extracts were washed with water and concentrated to a syrup under vacuum (20 mm. pressure).

The above syrup was dissolved in 7 liters of hexane. To this there was added 2.8 kg. of manganese hydrate having the approximate empirical formula:

$$K_2O \cdot MnO \cdot 20H_2O$$

and having the following analysis:

| | Percent |
|---|---|
| $K_2O$ | 5.4 |
| MnO | 4.0 |
| $MnO_2$ | 69.8 |
| $H_2O$ | 20.7 |

The reaction was stirred in an atmosphere of nitrogen and in the absence of light for 20 hours, at 20–25° C. The spent manganese hydrate was filtered and thoroughly washed with hexane. On evaporation of the solvent under vacuum at 40° C., there resulted 950 g. of crude vitamin A aldehyde.

950 g. of crude vitamin A aldehyde prepared above was dissolved in 2 liters of methyl alcohol and 20 ml. of pyridine.

210 g. of potassium hydroxide was dissolved in 2 liters of methanol, and half of the solution was added to the reaction mixture obtained above from the reaction of vitamin A isomer mixture with triphenyl-phosphine. Then the vitamin A aldehyde solution and the remainder of the potassium hydroxide solution were added from separate dropping funnels, over a period of 30 minutes. The reaction was then stirred overnight under a blanket of nitrogen.

The following morning the 13-mono-cis-β-carotene was filtered off by suction and washed with additional methyl alcohol. This was then placed in a flask with 2 liters of heptane, and the solvent distilled until a light slurry remained in the flask. The condenser was then fixed for reflux and this was stirred at 90–95° C. under an atmosphere of nitrogen for 20 hours. The contents of the flask were cooled to room temperature and the trans-β-carotene was again filtered by suction. It was washed with methyl alcohol, with warm water, and again with methyl alcohol. On drying the trans-β-carotene was produced.

Example 11

Hydroxenin mother liquors which result from the purification of hydroxenin by crystallization and which normally are discarded as waste, were concentrated under vacuum (20 mm. pressure) at 40° C. to a syrup. One part by weight of this syrup was dissolved in 5 parts by volume of pyridine, in 5 parts by volume of benzene and reacted with a solution of 1.1 parts by weight of palmitic acid chloride in 5 parts by volume of benzene. The mixture was stirred for 14 hours at room temperature. Thereupon the mixture was diluted with petroleum ether of a boiling point 30–60° C., successively washed with sodium bicarbonate solution and water, dried with sodium sulfate and concentrated to a viscous oil. Five parts by weight of this oil thus obtained were heated with 50 parts by volume of petroleum ether of a boiling of 80–120° C. and a solution of 0.1 part by weight of iodine in 10 parts by weight of petroleum ether of boiling point 80–120° C. was added in an inert atmosphere while stirring. The mixture was refluxed for 15 minutes, left to cool down, diluted with petroleum ether of a boiling point 30–60° C., successively washed with 95 percent methyl alcohol and water, dried and the solvent was evaporated. Residue was a yellow oil containing a crude vitamin A isomer mixture in the form of a syrup.

Triphenyl-phosphine (260 g.), and concentrated sulfuric acid (48 ml.) were dissolved in 3000 ml. of methyl alcohol in the order named, and the resulting solution was stirred for one hour.

1 kg. of the crude vitamin A isomer mixture prepared above was dissolved in 2000 ml. of methyl alcohol and added to the reaction vessel containing the above triphenyl-phosphine mixture. This was then stirred under an atmosphere of nitrogen for 20 hours.

The above syrup was dissolved in 2400 ml. of hexane. To this there was added 1120 g. of manganese hydrate having the approximate empirical formula:

$$K_2O \cdot MnO \cdot 14MnO_2 \cdot 20H_2O$$

and having the following analysis:

| | Percent |
|---|---|
| $K_2O$ | 5.4 |
| MnO | 4.0 |
| $MnO_2$ | 69.8 |
| $H_2O$ | 20.7 |

The reaction was stirred in an atmosphere of nitrogen and in the absence of light for 20 hours, at 20–25° C. The spent manganese hydrate was filtered and thoroughly washed with hexane. On evaporation of the solvent under vacuum at 40° C., there resulted crude vitamin A aldehyde.

950 g. of crude vitamin A aldehyde prepared above was dissolved in 2 liters of methyl alcohol and 20 ml. of pyridine.

210 g. of potassium hydroxide was dissolved in 2 liters of methanol, and half of the solution was added to the reaction mixture obtained above from the reaction of vitamin A isomer mixture with triphenyl-phosphine. Then the vitamin A aldehyde solution and the remainder of the potassium hydroxide solution were added from separate dropping funnels, over a period of 30 minutes. The reaction was then stirred overnight under a blanket of nitrogen.

The following morning the crude 13-mono-cis-β-carotene was filtered off by suction and washed with additional methyl alcohol. This was then placed in a flask with 2 liters of heptane, and the solvent distilled until a light slurry remained in the flask. The condenser was then fixed for reflux and this was stirred at 90–95° C. under an atmosphere of nitrogen for 20 hours. The contents of the flask were cooled to room temperature and the trans-β-carotene was filtered off by suction.

The hydroxenin mother liquors employed in the above process were obtained as follows:

Oxenin was partially hydrogenated in the presence of quinoline and 5 percent by weight, based on the weight of oxenin, of a lead poisoned palladium catalyst prepared by adding 3.5 parts of lead acetate to 41 parts of palladium chloride precipitated on calcium carbonate (5 percent palladium chloride). The hydrogenation was carried out with from 2 to 4 lbs. per square inch of pressure at 23–25° C. and was complete when approximately 1.05 moles of hydrogen had been consumed. The hydrogenation reaction mixture was then warmed to dissolve the partially precipitated hydroxenin and the catalyst was removed by filtration. The filtrate was cooled slowly and then cooled in the refrigerator and the crystalline hydroxenin filtered off. The mother liquor from the filtration was used as starting material in the above process.

Example 12

The mother liquors of 1-hydroxy-3,7-dimethyl-7-hydroxy-9-(2′,6′,6′-trimethyl-cyclohexene-1-yl) - nonatriene-2,5,8 prepared by the Grignard reaction 1-hydroxy-3-methyl hexene-(2)yne-(5) with β-ionone remaining after the crystallization of this nonatriene were concentrated under vacuum (20 mm. pressure) at 40° C. to a syrup. This syrup was dissolved in 30 parts by weight of quinoline and 6 parts by weight of acetic anhydrate. The solution was heated for 2 hours to 80–100° C. and then for one hour to 160–180° C. After cooling down, the mixture was shaken out with low boiling petroleum ether and then washed repeatedly with 95 percent methyl alcohol and with water. The petroleum ether was evaporated and the residue was fractionated by molecular distillation. About 2 parts by weight of a yellow viscous oil was obtained. This oil contained crude vitamin A.

Triphenyl-phosphine (260 g.), and concentrated sulfuric acid (48 ml.) were dissolved in 3000 ml. of methyl alcohol in the order named, and the resulting solution was stirred for one hour.

1 kg. of the crude vitamin A mother liquor prepared above was dissolved in 2000 ml. of methyl alcohol and added to the reaction vessel containing the above triphenyl-phosphine mixture. This was then stirred under an atmosphere of nitrogen for 20 hours.

This solution was used for the next step without further purification.

In a five-liter flask, there was placed 368 g. of crude vitamin A acetate. To this was added 2700 ml. of methyl alcohol, 25 ml. of a benzene solution containing 1.25 g. each of BHA and BHT, and 160 ml. of 50 percent aqueous sodium hydroxide solution. This was stirred under an atmosphere of nitrogen for one hour at 25°. The solution was transferred to a separator and diluted with an equal volume of water. Dry Ice was added while stirring, until the excess sodium hydroxide was reatced, as indicated by a pH measurement. This was then extracted 3 times with 700 ml. of petroleum ether. The combined extracts were washed with water and concentrated to a syrup under (20 mm. pressure).

The above syrup was dissolved in 2400 ml. of hexane. To this there was added 1120 g. of manganese hydrate having the approximate empirical formula:

$$K_2O \cdot MnO \cdot 14MnO_2 \cdot 20H_2O$$

and having the following analysis:

| | Percent |
|---|---|
| $K_2O$ | 5.4 |
| Mno | 4.0 |
| $MnO_2$ | 69.8 |
| $H_2O$ | 20.7 |

The reaction was stirred in an atmosphere of nitrogen and in the absence of light for 20 hours, at 20–25° C. The spent manganese hydrate was filtered and thoroughly washed with hexane. On evaporation of the solvent under vacuum at 40° C., there resulted crude vitamin A aldehyde.

255 g. of crude vitamin A aldehyde prepared above was dissolved in 2 liters of methyl alcohol and 20 ml. of pyridine.

210 g. of potassium hydroxide was dissolved in 2 liters of methanol, and half of the solution was added to the reaction mixture obtained above from the reaction of vitamin A isomer mixture with triphenyl-phosphine. Then the vitamin A aldehyde solution and the remainder of the potassium hydroxide solution were added from separate dropping funnels, over a period of 30 minutes. The reaction was then stirred overnight under a blanket of nitrogen.

The following morning the crude 13-mono-cis-β-carotene was filtered off by suction and washed with additional methyl alcohol. This was then placed in a flask with 2 liters of heptane, and the solvent distilled until a light slurry remained in the flask. The condenser was then fixed for reflux and this was stirred at 90–95° C. under an atmosphere of nitrogen for 20 hours. The contents of the flask were cooled to room temperature and the trans-β-carotene was again filtered by suction. It was washed with methyl alcohol, with warm water, and again with methyl alcohol. On drying, trans-β-carotene was obtained.

Example 13

The mother liquor remaining after the crystallization of the condensation product of β-ionylidine acetaldehyde with β-methyl glutaconic anhydride as set forth in Example 7 of U.S. Patent No. 2,709,712 was concentrated under vacuum (20 mm. pressure) at 40° C. to a syrup. 0.4 gram of this syrup was saponified by heating for 45 min. at 75° C. with 8 cc. of one normal potassium hydroxide and 2 cc. of ethyl alcohol. The alkaline solution was then acidified with dilute hydrochloric acid and the crude diacid thus formed was extracted out with ether. The crude vitamin A diacid was decarboxylated by heating. Decarboxylation was effected by heating the crude diacid in the presence of an organic base such as by heating 3.4 grams of the vitamin A diacide with 12 ml. of quinoline for 40 min. at 150–160° C. The mixture was then cooled, acidified and extracted with ether. The ether extract was in turn extracted with 4 percent aqueous sodium hydroxide and the basic extract was acidified to produce vitamin A acid. 0.5 gram portion of the crude vitamin A acid was dissolved in 50 cc. of anhydrous ether. To this solution was added 4 cc. of 1 normal solution of lithium alumino-hydride in anhydrous ether. The mixture was refluxed gently for 3 min. and then acidified with dilute hydrochloric acid. The ether solution was then washed successively with dilute hydrochloric acid, 0.5 normal potassium hydroxide and water, dried over sodium sulfate, filtered and the ether removed by evaporation. The crude vitamin A alcohol product was a yellow oil.

1.0 grams of the above crude vitamin A alcohol was dissolved in 50 ml. of hexane. To this was added 3.0 g. of MnO$_2$ and the reaction mixture stirred under an atmosphere of nitrogen in the absence of light for 20 hours at 20–25° C. The spent MnO$_2$ was filtered in an inert atmosphere and thoroughly washed with hexane. On evaporation of the solvent at 40° C. under vacuum, crude vitamin A aldehyde as brown oil was obtained.

Retinyl triphenyl-phosphonium chloride was next prepared as follows:

1.0 g. of the crude vitamin A alcohol prepared above was dissolved in 50 ml. of methanol. 1.5 g. of triphenyl-phosphine was added thereto at 2 ml. of methanolic HCl (0.172 g. HCl/ml.) was dropped in. The reaction was stirred under nitrogen for 24 hours to form the crude retinyl triphenyl-phosphonium chloride.

The reaction vessel containing the solution of crude retinyl triphenyl-phosphonium chloride was fitted with two dropping funnels. 5 ml. of freshly prepared solution of sodium methoxide in methyl alcohol which was prepared by dissolving 1 g. of metallic sodium in 50 ml. of methyl alcohol was added from one funnel. The crude vitamin A aldehyde previously prepared was dissolved in 50 ml. of methyl alcohol and added simultaneously from the other funnel. The additions were completed in two hours at 15–20° C. The stirring was continued under nitrogen overnight. On the following morning the crystalline crude cis-β-carotene was filtered and washed on the filter with 20 liters of water. The crystalline crude β-carotene was then suspended in 20 ml. of denatured alcohol and stirred under an atmosphere of nitrogen until refluxing started. The product was filtered hot and washed with a little denatured alcohol. After drying under vacuum and isomerization, there resulted pure trans-β-carotene.

I claim:

1. A process for the preparation of β-carotene comprising the steps of reacting
   (1) a phosphonium salt of vitamin A active material prepared from mother liquors selected from the group consisting of:
      (a) a mother liquor containing uncrystallizable C$_{20}$ material remaining after the synthesis of crystalline vitamin A alcohol,
      (b) a mother liquor containing uncrystallizable material having from 20 to 36 carbon atoms remaining after the synthesis of crystalline alkyl esters of vitamin A alcohols and
      (c) a mother liquor containing uncrystallizable C$_{20}$ material remaining after the synthesis of crystallizable C$_{20}$ intermediates convertible to vitamin A alcohols or alkyl esters thereof
   with
   (2) vitamin A active aldehyde prepared from mother liquors selected from the group consisting of:
      (a) a mother liquor containing uncrystallizable C$_{20}$ material remaining after the synthesis of crystalline vitamin A alcohol
      (b) a mother liquor containing uncrystallizable material having from 20 to 36 carbon atoms remaining after the synthesis of crystalline alkyl esters of vitamin A alcohols and
      (c) a mother liquor containing uncrystallizable C$_{20}$ material remaining after the synthesis of crystalline C$_{20}$ intermediates convertible to vitamin A alcohol
   in the presence of a proton acceptor to form cis-β-carotene.

2. The process according to claim 1 wherein the phosphonium salt is prepared from other liquors containing uncrystallizable material resulting from the preparation of vitamin A alcohol resulting from the Grignard condensation of β-ionone with 1-hydroxy-3-methylhexene-(2)-yne-(5).

3. The process according to claim 1 wherein the phosphonium salt is prepared from mother liquors containing uncrystallizable material resulting from the preparation of vitamin A alcohol by the Grignard condensation of 4-(2',6',6'-trimethyl-cyclohexen-1'-yl)-2-methyl-butene-2-al-(1) and 1-hydroxy-3-methyl-pentene-(2)-yne-(4).

4. The process according to claim 1 wherein the phosphonium salt is prepared from mother liquors containing uncrystallizable material resulting from the preparation of vitamin A alcohol by the reaction of the condensation product of β-ionylidene ethanol and acetone with an α-halo acetic acid.

5. The process according to claim 1 wherein the phosphonium salt is produced from a mother liquor containing uncrystallizable C$_{20}$ material remaining after the synthesis of crystalline hydroxenin by subjecting the mother liquor to the following steps:
   (1) treating said mother liquor with an esterifying agent,
   (2) subjecting said esterified mother liquor to dehydration and allyl rearrangement, and
   (3) thereafter reacting said mother liquor with a material selected from the group consisting of a compound of the formula:

(a) 

wherein R$_1$, R$_2$ and R$_3$ are selected from a group consisting of alkyl radicals containing from 1–14 carbon atoms, aryl radicals containing from 6–18 carbon atoms and aralkyl radicals containing from 7–23 carbon atoms,
   in the presence of a proton donor, and
      (b) an acid addition salt of a compound of the formula:

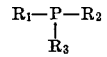

wherein R$_1$, R$_2$ and R$_3$ are as above.

6. The process of claim 1 wherein said phosphonium salt is produced from a mother liquor containing uncrystallizable C$_{20}$ material remaining after the synthesis of crystalline oxenin by subjecting the mother liquor to the following steps:
   (1) subjecting said isolated C$_{20}$ mother liquors to partial hydrogenation,
   (2) treating said mother liquor with an esterifying agent,
   (3) subjecting said esterified mother liquor to dehydration and allyl rearrangement and
   (4) thereafter reacting said esterified mother liquor with a material selected from the group consisting of a compound of the formula:

(a) 

wherein R$_1$, R$_2$ and R$_3$ are selected from a group consisting of alkyl radicals containing from 1–14 carbon atoms, aryl radicals containing from 6–18 carbon atoms and aralkyl radicals containing from 7–23 carbon atoms,
   in the presence of a proton donor, and
      (b) an acid addition salt of a compound of the formula:

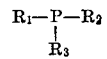

wherein R$_1$, R$_2$ and R$_3$ are as above.

7. A process for preparing a phosphonium salt of a vitamin A active material comprising reacting (1) a mother liquor containing uncrystallizable $C_{20}$ material remaining after the synthesis of crystalline $C_{20}$ intermediate convertible to vitamin alcohols or alkyl esters thereof wherein said mother liquor has been worked up in the same manner as crystalline $C_{20}$ intermediate is worked up to form vitamin A alcohol or alkyl esters thereof with (2) a compound selected from the group consisting of (a)     

wherein $R_1$, $R_2$ and $R_3$ are selected from a group consisting of alkyl radicals containing from 1–14 carbon atoms, aryl radicals containing from 6–18 carbon atoms and aralkyl radicals containing from 7–23 carbon atoms, in the presence of a proton donor, and (b) an acid addition salt of a compound of the formula:

wherein $R_1$, $R_2$ and $R_3$ are as above.

8. The process according to claim 7 wherein said mother liquor is produced from hydroxenin mother liquor remaining after the synthesis of crystalline hydroxein $C_{20}$ intermediate by subjecting said hydroxenin mother liquor to esterification followed by dehydration and allyl rearrangement.

9. The process according to claim 7 wherein said mother liquor is produced from oxenin mother liquor remaining after the synthesis of crystalline oxenin by partially hydrogenating said oxenin mother liquor, treating said oxenin mother liquor with an esterifying agent, subjecting said esterified oxenin mother liquor to dehydration and allyl rearrangement.

10. A process of preparing a phosphonium salt of a vitamin A active material comprising reacting (1) the mother liquor containing uncrystallizable $C_{20}$ material remaining after the preparation of crystalline vitamin A alcohol by the Grignard condensation of 4(2',6',6'-trimethyl-cyclohexen-1'-yl) - 2 - methyl-butene-2-al-(1) and 1-hydroxy-3-methyl-pentene-2-yne-(4)

with (2) a material selected from the group consisting of (a)     

wherein $R_1$, $R_2$ and $R_3$ are selected from a group consisting of alkyl radicals containing from 1–14 carbon atoms, aryl radicals containing from 6–18 carbon atoms and aralkyl radicals containing from 7–23 carbon atoms, in the presence of a proton donor, and (b) an acid addition salt of a compound of the formula:

wherein $R_1$, $R_2$ and $R_3$ are as above.

11. A process for preparing a phosphonium salt of a vitamin A active material comprising reacting (1) the mother liquor containing uncrystallizable $C_{20}$ material remaining after the crystallization of vitamin A alcohol by the Grignard condensation of β-ionone with 1-hydroxy-3-methylhexene-(2)-yne-(5), with (2) a material selected from the group consisting of (a)     

wherein $R_1$, $R_2$ and $R_3$ are selected from a group consisting of alkyl radicals containing from 1–14 carbon atoms, aryl radicals containing from 6–18 carbon atoms and aralkyl radicals containing from 7–23 carbon atoms, in the presence of a proton donor, and (b) an acid addition salt of a compound of the formula:

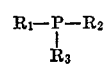

wherein $R_1$, $R_2$ and $R_3$ are as above.

12. A process for preparing a crude vitamin A active aldehyde comprising treating with an oxidizing agent mother liquors selected from the group consisting of (a) a mother liquor containing uncrystallizable $C_{20}$ material remaining after the synthesis of crystalline vitamin A alcohol, (b) mother liquor containing uncrystallized material having from 20 to 36 carbon atoms remaining after the synthesis of crystalline alkyl esters of vitamin A alcohol wherein this mother liquor has been treated with a saponifying agent, and (c) mother liquors containing uncrystallizable $C_{20}$ material remaining after the synthesis of crystalline $C_{20}$ intermediates convertible to vitamin A alcohol wherein this mother liquor has been worked up to vitamin A alcohol in the same manner as the crystalline $C_{20}$ intermediate is worked up to vitamin A alcohols.

13. The process according to claim 12 wherein said mother liquor is produced from hydroxenin mother liquor remaining after the synthesis of $C_{20}$ crystalline intermediate hydroxenin by subjecting said hydroxenin mother liquor to esterification, dehydration and allyl rearrangement and saponification.

14. The process according to claim 12 wherein said mother liquor is produced from oxenin mother liquor remaining after the synthesis of the crystalline $C_{20}$ intermediate oxenin by partially hydrogenating said oxenin mother liquor and subjecting said oxenin mother liquor to esterification, dehydration and allyl rearrangement and saponification.

15. A process according to claim 12 wherein said mother liquor is produced after the preparation of crystalline vitamin A alcohol by the Grignard condensation of 4-(2',6',6'-trimethyl-cyclohexen-1'-yl) - 2 - methyl-butene-2-al-(1) and 1-hydroxy - 3 - methylpentene-2-yne-(4).

16. The process according to claim 12 wherein the aldehyde is prepared from mother liquor containing uncrystallizable material resulting from the preparation of vitamin A alcohol resulting from the Grignard condensation of β-ionone with 1-hydroxy - 3 - methylhexen-(2)-yne-(5).

17. The process according to claim 14 wherein the aldehyde is prepared from mother liquor containing uncrystallizable material resulting from the preparation of vitamin A alcohol by the reaction of the condensation product of β-ionylidene ethanol and acetone with an α-halo acetic acid.

18. The process of claim 1 comprising the additional step of isomerizing the so formed cis-β-carotene by heating to a temperature of from 50° to 100° C. in an inert organic solvent to form all trans-β-carotene.

References Cited

UNITED STATES PATENTS

| | | | |
|---|---|---|---|
| 2,610,208 | 9/1956 | Surmatis | 260—491 |
| 2,671,123 | 3/1954 | Inhoffen et al. | 260—666 |
| 2,849,507 | 8/1958 | Isler et al. | 260—666 |
| 2,945,069 | 7/1960 | Stern | 260—666 |
| 2,809,216 | 10/1957 | Inhoffen | 260—666 |
| 2,842,599 | 7/1958 | Isler et al. | 260—601 |
| 3,367,985 | 2/1968 | Surmatis | 260—666 |
| 2,849,506 | 7/1958 | Isler et al. | 260—666 |
| 2,867,652 | 1/1959 | Isler et al. | 260—666 |
| 3,311,656 | 3/1967 | Surmatis | 260—488 |
| 3,347,932 | 10/1967 | Chechak | 260—666 |

OTHER REFERENCES

Chem. Eng. News, vol. 29, No. 39, pp. 3962–3, Sept. 20, 1951.

DELBERT E. GANTZ, *Primary Examiner.*

J. O'KEEFE, *Assistant Examiner.*

UNITED STATES PATENT OFFICE
CERTIFICATE OF CORRECTION

Patent No. 3,441,623                                     April 29, 1969

Joseph Donald Surmatis

It is certified that error appears in the above identified patent and that said Letters Patent are hereby corrected as shown below:

Column 1, line 38, after "1964" insert -- , now abandoned --. Column 2, lines 35 to 37, the formula should appear as shown below:

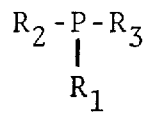

Column 3, line 49, "uncrystallized" should read -- uncrystallizable --. Column 4, line 60, "insert" should read -- inert --. Column 5, line 21, "Non-pharmaceutical" should read -- Non-pharmaceutically --. Column 8, line 45, "-3(6-diol" should read -- -3,6-diol --. Column 10, line 53, "$10_6$" should read -- $10^6$ --. Column 11, line 10, "0.851 × $10_6$ u./g.," should read -- 0.851 × $10^6$ u./g., --; line 22, after "6 liters of hexane." insert -- The combined hexane extracts were washed with 6 liters of water. --; line 61, "-cyclohexane-" should read -- -cyclohexene- --. Column 13, line 29, "voulme" should read -- volume --. Column 16, line 10, "syrup under" should read -- syrup under vacuum --. Column 21, line 7, "2,671,123" should read -- 2,671,112 --. Column 22, line 6, "Sept. 20, 1951" should read -- Sept. 24, 1951 --.

Signed and sealed this 21st day of April 1970.

(SEAL)
Attest:

EDWARD M. FLETCHER, JR.                       WILLIAM E. SCHUYLER, JR.
Attesting Officer                                     Commissioner of Patents